United States Patent
Endo et al.

[11] Patent Number: 5,861,725
[45] Date of Patent: Jan. 19, 1999

[54] CONTROL APPARATUS FOR ELECTRIC POWER STEERING SYSTEM

[75] Inventors: Shuji Endo; Hideyuki Kobayashi, both of Maebashi, Japan

[73] Assignee: NSK Ltd., Tokyo, Japan

[21] Appl. No.: 909,806

[22] Filed: Aug. 12, 1997

[30] Foreign Application Priority Data

Aug. 19, 1996 [JP] Japan .................................. 8-234648
Oct. 7, 1996 [JP] Japan .................................. 8-282875

[51] Int. Cl.$^6$ ........................................................ B62D 5/04
[52] U.S. Cl. ........................... 318/434; 180/446; 701/41
[58] Field of Search ................................... 318/434, 432, 318/433, 646, 466, 467, 468, 469, 470; 180/446; 701/41, 42, 43

[56] References Cited

U.S. PATENT DOCUMENTS

| | | | |
|---|---|---|---|
| 4,509,611 | 4/1985 | Kade et al. | 180/446 |
| 4,865,148 | 9/1989 | Marumoto et al. | 180/446 |
| 4,972,320 | 11/1990 | Sugiura et al. | 364/424.053 |
| 5,596,252 | 1/1997 | Shimizu et al. | 318/432 |
| 5,740,040 | 4/1998 | Kifuku et al. | 701/41 |
| 5,752,209 | 5/1998 | Nishimoto et al. | 701/41 |

FOREIGN PATENT DOCUMENTS

| | | |
|---|---|---|
| 61-81866 | 4/1986 | Japan . |
| 62-205855 | 9/1987 | Japan . |
| 08150954 A | 11/1996 | Japan . |
| 5-10271 | 2/1997 | Japan . |

*Primary Examiner*—John W. Cabeca
*Attorney, Agent, or Firm*—Brinks Hofer Gilson & Lione

[57] ABSTRACT

A steering force assist command value in correspondence with a steering torque is represented by approximation function equations lower than the order of the higher order function equation. The steering torque is sampled at predetermined time intervals and the steering force assist command value in correspondence with the sampled steering torque is calculated by the approximation function equations where when data outputted from a calculation device comprise 16-bit data, upper 8-bit data is outputted to a motor drive circuit and lower 8-bit data is omitted, and the omitted lower 8-bit data is added in calculating operation of next sampling period. An error of the steering force assist command value by omission of the lower 8-bit data is reduced and steering feeling can be improved.

10 Claims, 9 Drawing Sheets

CONTROL APPARATUS FOR ELECTRIC POWER STEERING SYSTEM

BACKGROUND OF THE INVENTION

The present invention relates to a control apparatus for an electric power steering system.

An electric power steering system for vehicle detects a steering torque generated at a steering shaft by operating a steering wheel and a vehicle speed, calculates a steering assist instruction value on the basis of the detected signal and assists a steering force of the steering wheel by driving a motor in accordance with the calculated steering assist instruction value where an electronic control apparatus including a microcomputer is used for calculating the steering assist instruction value and controlling the motor on the basis of the steering assist instruction value.

In this case, in respect of the steering torque, there are a component in correspondence with road load generated by the steering and a component in correspondence with a frictional force of a steering mechanism. Therefore, there has been proposed a control apparatus for calculating the steering force assist command value by adding a control value in correspondence with the road load determined on the basis of the detected steering torque and a control value in correspondence with the frictional force of the steering mechanism.

According to the constitution, the control value for the road load in correspondence with the steering torque and the control value for the frictional force in correspondence with the steering torque are previously determined and stored in a memory and desired data is read from the memory in correspondence with the detected steering torque whereby the steering force assist command value is calculated (refer to Japanese Examined Patent Publication No. JP 5-10271).

According to the above-described control apparatus for calculating the steering force assist command value, the control value for the road load and the control value for the frictional force are predetermined in accordance with the steering torque and therefore, when the steering torque is determined, the steering force assist command value changes only in correspondence with the car speed.

Accordingly, when the steering force assist command values in correspondence with the steering torques are previously set and stored in a memory with respect to a plurality of the car speeds, the steering force assist command values can be calculated immediately from the detected steering torques and the detected car speeds.

FIG. 10 is for explaining a conventionally known method of setting the steering force assist command value in correspondence with the steering torque with respect to car speeds V1, V2 and V3 where the steering force assist command values I in correspondence with the detected values of the steering torque T1, T2, T3 and T4 are set in accordance with respective car speeds. As shown by FIG. 10, for example, when the car speed is V1, the steering force assist command value I1 is set for the steering torque T1, I2 for T2, I3 for T3 and I4 for T4, and when the constant steering force assist command values I are stepwisely set such that the steering force assist command value I1 is set in the range of the steering torque of T1 through T2, the steering force assist command value I2 in the range of the steering torque of T2 through T3, and the steering force assist command value I3 in the range of the steering torque of T3 through T4, the capacity of a memory can be reduced. However, when the steering force assist command values I are set stepwisely, the steering force assist command values I are not changed continuously in compliance with changes in the car speed and the steering torque and accordingly, the steering assist force is not changed smoothly whereby the steering feeling is deteriorated.

As a measure therefor, the steering force assist command value may be set as finely as possible in correspondence with the steering torque and the car speed, however, a necessary capacity of a memory is significantly increased by this method, resulting in an increase in cost.

Accordingly, the applicant has proposed a method where the steering force assist command values in correspondence with the steering torques are stored in a memory in respect of representative car speeds, when the detected car speed is determined to be at an intermediary of the representative car speeds stored in a memory, the steering force assist command values in correspondence with the steering torques with respect to the representative car speeds faster and slower than the detected car speed, are read from a memory means and the steering force assist command value corresponding to the detected car speed and the detected steering torque is calculated on the basis of differences thereof with respect to the detected car speed and a car speed correction coefficient (Japanese Laid-Open Patent Publication No. Heisei 8-15095).

However, even with the method where the steering force assist command values in correspondence with the steering torques are stored in a memory with respect to the representative car speeds, when the steering force assist command values in correspondence with the steering torques are finely set, a necessary capacity of the memory is still increased, resulting in an increase in cost. Moreover, when the steering force assist command values are changed, stored data of the memory must be changed which requires time and labor.

As a further problematic point, when the steering force assist command values in correspondence with the steering torques are calculated, in calculating by a limited word length of, for example, 8 bits, lower digits (8 bits) of a result of calculation (constituting of 16 bits) are omitted whereby a quantization error on the basis of a digital calculation is caused. Such a quantization error is not preferable since discontinuous steering feeling is given to a driver when a slow steering operation is conducted.

That is, according to the above-described electronic control circuit for an electric power steering system, a low resolution circuit dealing with 8 bits signals is generally used, even if a result of calculation by a microcomputer is of 16 bit signals, in the case of a low resolution circuit where a PWM signal processing circuit or an A/D (analog/digital) conversion circuit deals with 8 bits signals, whether 0 is to be outputted or 1 is to be outputted cannot be determined as an output value when signals smaller than the resolution are dealt with and accordingly, the output signal is vibrated with a resolution of substantially 1 bit. This is referred to as limit cycle vibration.

Such a vibration includes a vibration component in the steering force assist command value and is felt as an unpleasant vibration in slow steering operation.

SUMMARY OF THE INVENTION

It is a principal object of the present invention to provide a control apparatus for an electric power steering system having excellent steering feeling where a steering assist force is smoothly changed in correspondence with changes in a car speed and a steering torque.

It is other object of the present invention to provide a control apparatus for an electric power steering system where a capacity of a memory that is a major constituent component of an electronic control circuit for calculating and determining a steering assist force on the basis of the car speed and the steering torque, can be saved and steering feeling is improved.

It is other object of the present invention to provide a control apparatus for an electric power steering system where limit cycle vibration caused by deficiency in resolution of an electronic control circuit for calculating and determining a steering assist force on the basis of the car speed or the steering torque is reduced and steering feeling is improved.

Other objects of the present invention will be clarified from a detailed explanation in reference to the drawings.

DETAILED DESCRIPTION OF THE PREFERRED EMBODIMENTS

Figure 1:
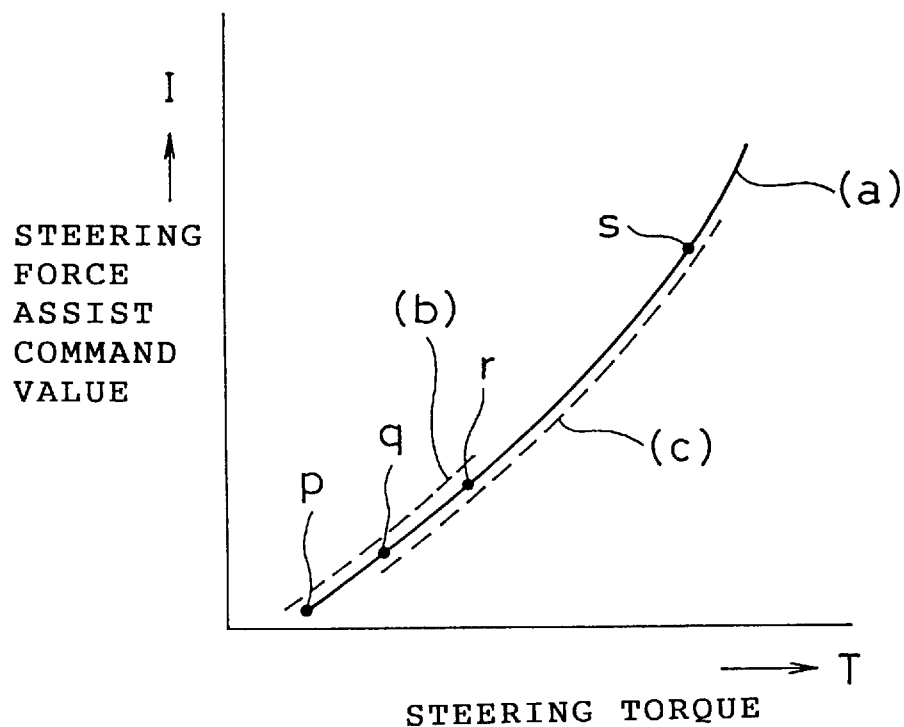
FIG. 1 is a diagram for explaining of setting a characteristic curve where a desired steering force assist command value in correspondence with a steering torque is represented by a function equation at higher order and approximation equations according to the present invention.

An explanation will be given of characteristics and embodiments of the present invention as follows. In FIG. 1, curve (a) is a characteristic curve showing a relationship between a steering torque and a desired steering force assist command value corresponding to the steering torque where the relationship between the steering torque T and the steering force assist command value In is defined by a function equation In=f(T)$^n$ at a higher order (nth order). Therefore, the steering force assist command value In corresponding to the steering torque T can be calculated by a numerical calculation on the basis of the defined predetermined higher order function equation In=f(T)$^n$.

However, it is not realistic to perform the numerical calculation of the steering force assist command value on the basis of such a higher order function equation by CPU constituting the calculating means since long time is required for carrying out complicated calculation. Therefore, although it is conceivable to carry out the numerical calculation by using an approximation equation that is approximated to the higher order function equation, in order to promote the degree of approximation, for example, 4th order approximation equation is formed in the case where 4 points are previously sampled from the curve representing the higher order function equation and an approximation equation interpolating the 4 points is determined, if the approximation equation is calculated by a limited word length of, for example, 8 bits, a term having no effective digit may be caused at higher order 8 bits depending on the magnitude of coefficients of the approximation equation, whereby the accuracy is deficient in the result of calculation or a number of times of multiplication is increased or the like by which the error is enlarged only by adopting the higher order 8 bits thereby causing a quantization error on the basis of a digital calculation.

Hence, according to the present invention, as shown by FIG. 1, four points (p, q, r, s) are previously sampled from the steering force assist command value corresponding to the steering torque that is defined by the higher order function equation In=f(T)$^n$ and an approximation is performed by two of second order function equation respectively interpolating 3 points (p, q, r) and 3 points (q, r, s) sharing intermediate 2 points (q, r) among them.

That is, a second order function equation I1 interpolating points (p, q, r) and a second order function equation I2 interpolating points (q, r, s) are defined by the following Equations (1) and (2).

$$I1 = a1T^2 + b1T + c \qquad (1)$$

$$I2 = a2T^2 + b2T + c \qquad (2)$$

where T: detected steering torque a1, a2, b1, b2, c: constants

I1, I2: steering force assist command values.

In FIG. 1, curve (a) indicates the characteristic curve of the higher order function equation In=f(T)$^n$ representing the steering force assist command value, curve (b) indicates a characteristic curve of the second order function equation I1 representing the steering force assist command value and curve (c) similarly indicates a characteristic curve of the second order function equation I2.

By approximating the higher order function equation by two of the second order function equations, the steering force assist command value corresponding to the steering torque is easily calculated by the calculation and further, a quantization error can be minimized.

When either one of the approximation equations is selected in accordance with the detected steering torque and the steering force assist command value corresponding to the detected steering torque is calculated on the basis of the selected approximation equation, the calculation can be made swiftly and easily.

When the approximation is performed by two of the second order function equations interpolating 4 points, since the order of the function equation is low, the quantization error can be made smaller than in the case of calculation by using the 4th order function equation explained above. Further, when the approximation is carried out by two of the second order function equations, the approximation is conducted by either one of the second order function equations except transient points where one of the approximation equations is shifted to the other one thereof and accordingly, the steering force assist command value corresponding to the steering torque is smoothly changed. Thereby, no strange feeling is caused in operating the steering wheel by a driver.

Furthermore, according to the present invention, in order to reduce the quantization error in calculating the steering force assist command value, processings explained below are carried out. That is, when the steering force assist command value corresponding to the steering torque is calculated by a limited word length of 8 bits on the basis of the second order function equations, the result of the calculation is outputted by 16-bit data since the calculation includes multiplication. However, a motor drive circuit for controlling motor current by inputting the calculated steering force assist command value, is inputted with 8-bit data and accordingly, only higher 8-bit data of the result of calculation that is outputted by 16-bit data, is outputted to the motor drive circuit and lower 8-bit data is omitted thereby causing the quantization error.

Hence, the quantization error caused by omission of lower 8-bit data is reduced by adding the omitted lower 8-bit data to the steering force assist command value calculated on the basis of the steering torque that is detected in a successive period of sampling.

When, a steering force assist command value is calculated by a word length of 16 bits, the result of the calculation is outputted by 32-bit data. In this case, only higher 16-bit data is outputted to the motor drive circuit and lower 16-bit data is added to the steering force assist command value in a successive period of sampling.

Figure 2:
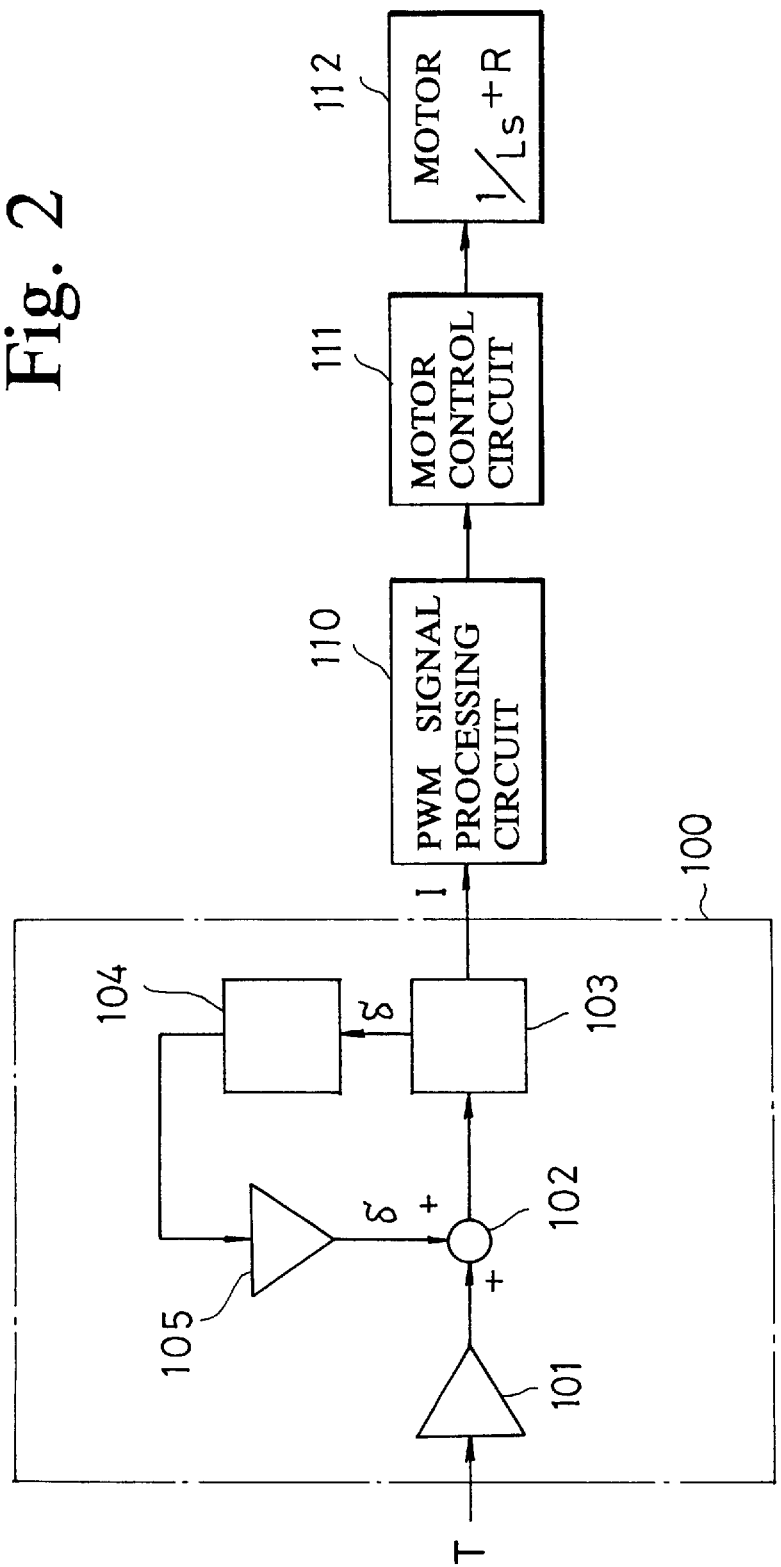
FIG. 2 is a circuit diagram showing a circuit for reducing a quantization error by a transfer function.

FIG. 2 shows a quantization error reducing circuit 100 by a transfer function where numeral 101 designates a calculation element for calculating the steering force assist command value corresponding to the steering torque on the basis of the second order approximation equation (1), numeral 102 designates an addition element, numeral 103 designates a calculation element for omitting lower 8-bit data of 16-bit data, numeral 104 designates a memory element for temporarily storing the lower 8-bit data omitted by the calculation element 103 and numeral 105 designates a gain control element.

Further, numeral 110 designates a PWM signal processing circuit for forming a PWM signal on the basis of a steering force assist command value I outputted from the calculation element 103 and numeral 111 designates a motor control circuit for controlling to drive a motor by the PWM signal, that is a circuit connecting semiconductor elements in an H bridge. Numeral 112 designates a motor an electric property of which is represented by $\{1/(Ls+R)\}$ in a transfer function. Here, notation L designates an inductance of the motor, notation s designates Laplacian operator and notation R designates a resistance between terminals of the motor.

An explanation will be given of the operation of the circuit for reducing a quantization error. The detected steering torque T is inputted to the calculation element 101 as 8-bit data where the steering force assist command value is calculated on the basis of the approximation equation and the steering force assist command value I1 of 16 bits is outputted. The outputted data is inputted to the calculation element 103 via the addition element 102 where the lower 8-bit data is omitted and the higher 8-bit data is outputted as the steering force assist command value I for the purpose of control. Meanwhile, the omitted lower 8-bit data (quantization error) $\delta$ is temporarily stored in the memory element 104, the gain thereof is controlled by the gain control element 105, the lower bits data is read in a successive period of sampling and outputted to the addition circuit 102 as data delayed by one sampling period and is added to the steering force assist command value I1 which is calculated in respect of the steering torque sampled in the successive sampling period.

In this way, the successively omitted lower 8-bit data (quantization error) $\delta$ is added to the steering force assist command value I1 on the basis of the steering torque sampled in the successive sampling period and therefore, the quantization error caused by omission of the lower 8-bit data can be reduced. Incidentally, although the above-described explanation is an explanation for reducing the quantization error on the basis of the second order approximation Equation (1), a similar explanation is applicable to the case on the basis of the second approximation Equation (2).

Figure 3:
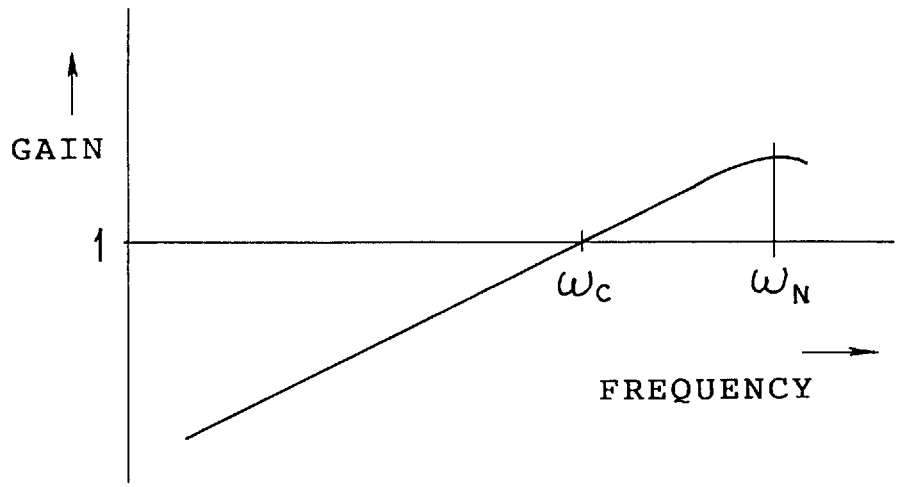
FIG. 3 is a diagram for explaining transfer characteristic of a circuit for reducing a quantization error.
Figure 4:
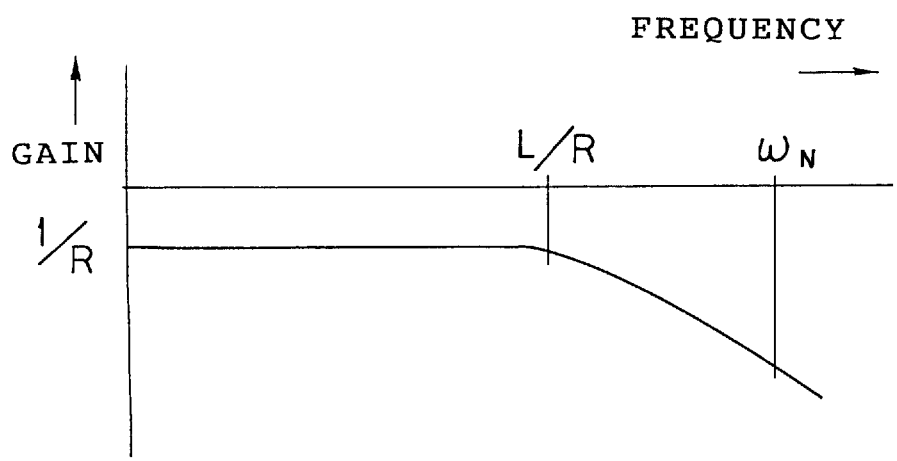
FIG. 4 is a diagram for explaining an electric property of a motor.

The circuit for reducing the quantization error shown by FIG. 2, explained above, is provided with a characteristic of a high pass filter in respect of the transfer characteristic from occurrence of quantization error to outputting at the adder 102, which is a characteristic shown by FIG. 3. Hence, when a low pass filter is inserted on the output side of the calculation circuit 103, as shown by FIG. 4, the gain is equal to or lower than 1 over entire frequencies whereby the influence of the quantization error can be reduced over entire frequencies.

In this case, although the quantization error is fed back by the error reducing circuit shown by FIG. 2, the circuit is not limited thereto but a pertinent circuit can be used so far as it is a circuit having the characteristic of a high pass filter and it is generally preferable that the quantization error is fed back such that the transfer characteristic becomes $(1-Z^{-1})^n$. The larger the value of n, the more the effect of the high pass filter is operated. Further, the crossover frequency of $(1-Z^{-1})^n$ is $1/\pi$ in respect of the Nyquist frequency and therefore, it is preferable that the cut-off frequency of the low pass filter is $1/\pi$.

An explanation will be given here of the quantization error. The quantization error $\delta$ can be regarded as white noise and therefore, it can be dealt with as data independent from the steering force assist command value I. The steering torque and the motor current are proportional to each other and therefore, the influence of the quantization error can be evaluated as an influence on the motor current and accordingly, the following relationship of Equation (3) is established.

$$|G(s) \cdot M(s)|G(s)|\infty \leq 1/R \qquad (3)$$

where R: Resistance between terminals of motor

M(s): 1/Ls+R

L: Inductance of motor s: Laplacian operator

G(s): Transfer function formed by converting transfer characteristic $(1-Z^{-1})^n$ of circuit for reducing quantization error into a continuous time system $|~|\infty$: Maximum value of gain.

In order to establish the relationship of Equation (3), electric time constant of a motor may be set to the crossover frequency $\omega c$ or less of the high pass filter. That is, the electric time constant of a motor may be set to $1/\pi$ or less of the Nyquist frequency $\omega N$, or $\frac{1}{2}\pi$ or less of the sampling period Ts. The reason is that a relationship of $\omega N = \frac{1}{2}$ Ts is established between the sampling period Ts and the Nyquist frequency $\omega N$.

As has been explained, according to the circuit for reducing quantization error shown by FIG. 2, the transfer characteristic from occurrence of quantization error to outputting at the adder 102, is set to have the characteristic of a high pass filter and a quantization error signal becomes an output that has passed through the high pass filter and therefore, the quantization error is distributed at a certain frequency or higher. As a measure therefor, the influence of the quantization error distributed at a certain frequency or higher can be excluded by inserting a low pass filter on the output side of the quantization error reducing circuit.

In an actual circuit, the electric characteristic of a motor for generating the steering assist force is provided with the characteristic shown by FIG. 4 and functions as a low pass filter and therefore, the low pass filter is not needed as a special circuit part and the electric time constant of the motor is set to at least ½π of the sampling frequency of the steering torque.

Figure 5:
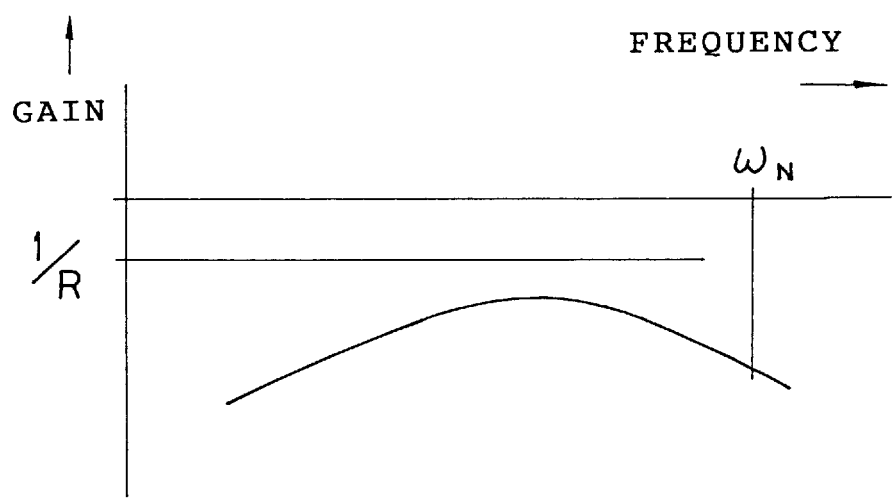
FIG. 5 is a diagram for explaining transfer characteristic when a low pass filter is inserted at an output side of a circuit for reducing a quantization error.

In this way, when the low pass filter is inserted on the output side of the quantization error reducing circuit, the transfer characteristic as a whole becomes a characteristic as shown by FIG. 5, the gain becomes 1/R (R is a resistance between terminals of motor) or lower in the entire frequency range whereby the quantization error can be reduced. Incidentally, in respect of the quantization error reducing circuit explained above, a quantization error reducing circuit constituted by specific circuit elements is not provided in the control circuit but it is a function carried out at the inside of CPU constituting the control circuit.

Further, curve (a) of FIG. 1 explained above is the characteristic curve of the function equation $In=f(T)^n$ showing the relationship between the steering torque and a desired steering force assist command value corresponding to the steering torque, however, the function equation differs in accordance with the car speed. Accordingly, a plurality of the function equations $In=f(T)^n$ showing the relationship between the steering torque and the desired steering force assist command value corresponding to the steering torque are set in accordance with the car speed and naturally, a plurality of approximation equations are set with regard to respective car speeds. The correction of the steering force assist command value based on the car speed can be carried out by pertinently selecting the approximation equations in accordance with the detected car speeds and calculating the steering force assist command value corresponding to the steering torque on the basis of the selected approximation equation.

Figure 6:
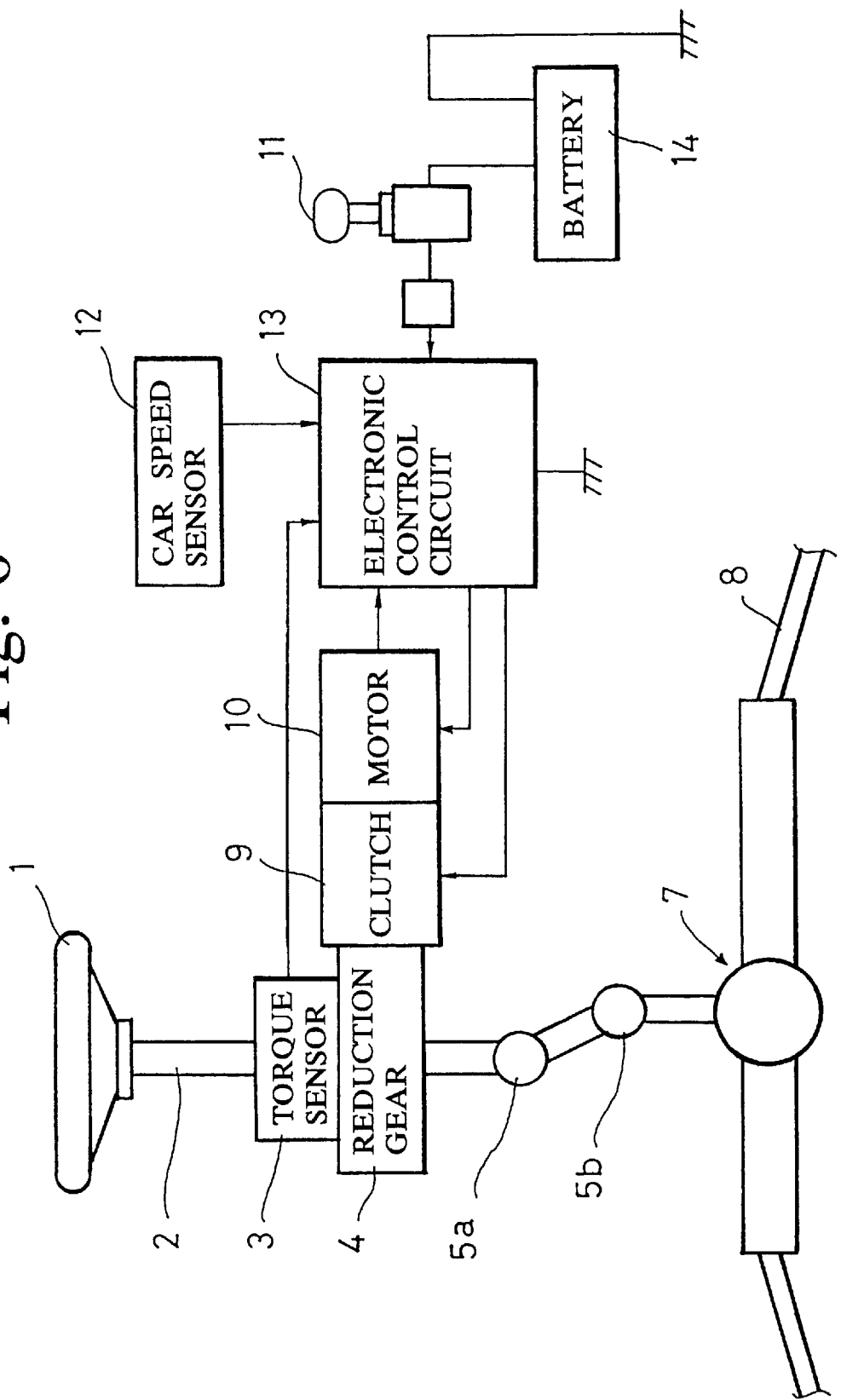
FIG. 6 is a view for explaining an outline of a constitution of an electric power steering system.

FIG. 6 is a view for explaining an outline of the constitution of an electric power steering system suitable for carrying out the present invention. A shaft 2 of a steering wheel 1 is coupled to tie rods 8 of steering wheels via a reduction gear 4, universal joints 5a and 5b and a pinion rack mechanism 7. A torque sensor 3 for detecting the steering torque of the steering wheel 1 is installed to the shaft 2 and a motor 10 for assisting the steering force is coupled to the shaft 2 via a clutch 9 and the reduction gear 4.

An electronic control circuit 13 for controlling the power steering system is supplied with power from a battery 14 via an ignition key 11. The electronic control circuit 13 calculates the steering force assist command value based on the steering torque detected by the torque sensor 3 and the car speed detected by a car speed sensor 12 and controls current supplied to the motor 10 on the basis of the calculated steering force assist command value.

The clutch 9 is controlled by the electronic control circuit 13. The clutch 9 is engaged in a normal operational state and is disengaged when malfunction of the power steering system is determined by the electronic control circuit 13 and when the power source is OFF.

Figure 7:
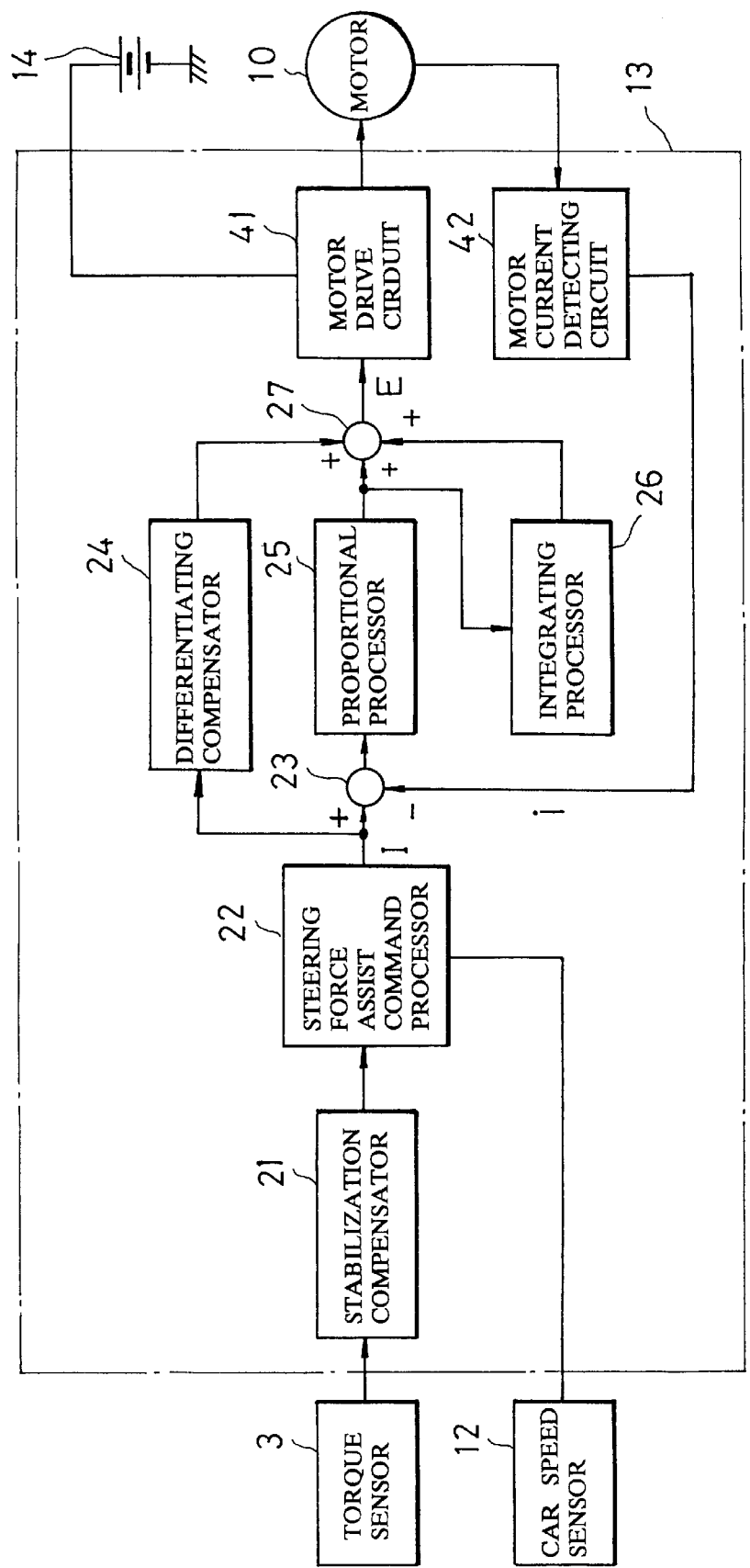
FIG. 7 is a block diagram of an electronic control circuit.

FIG. 7 is a block diagram of the electronic control circuit 13. In the embodiment, the electronic control circuit is mainly constituted by CPU and in this diagram functions executed by programs at the inside of CPU are shown. For example, a stabilization compensator 21 is not a stabilization compensator 21 as an independent hardware but indicates a stabilization compensating function executed by CPU.

An explanation will be given of the function and the operation of the electronic control circuit 13. A steering torque signal inputted from the torque sensor 3 is compensated with respect to a phase thereof by the stabilization compensator 21 to promote stability of the steering system and is inputted to a steering force assist command processor 22. Further, the car speed detected by the car speed sensor 12 is also inputted to the steering force assist command processor 22.

The steering force assist command processor 22 determines a steering force assist command value I that is a target value for controlling current supplied to the motor 10 on the basis of the inputted torque signal and the inputted car speed signal.

A circuit constituted by a comparator 23, a differentiating compensator 24, a proportional processor 25, an integrating processor 26 and an adder 27, is a circuit for carrying out a feed back control such that an actual motor current value i coincides with the steering force assist command value I.

The proportional processor 25 outputs a proportional value in proportion to a difference between the steering force assist command value I and the actual motor current value i. Further, an output signal from the proportional processor 25 is integrated at the integrating processor 26 to improve the characteristic of the feed back system where a value proportional to an integral value of the difference is outputted.

In the differentiating compensator 24, the differential value of the steering force assist command value I is outputted to promote the response speed of the motor current value i actually flowing in the motor with respect to the steering force assist command value I calculated by the steering force assist command processor 22.

The differential value of the steering force assist command value I outputted from the differentiating compensator 24, the proportional value in proportion to the difference between the steering force assist command value outputted from the proportional processor 25 and the actual motor current value, and the integral value outputted from the integrating processor 26, are added at the adder 27 where a current control value E that is the result of calculation is outputted to a motor drive circuit 41 as the motor drive signal.

In the comparator 23, the steering force assist command value I which is the target value for controlling is compared with motor current i detected by a motor current detecting circuit 42.

Figure 8:
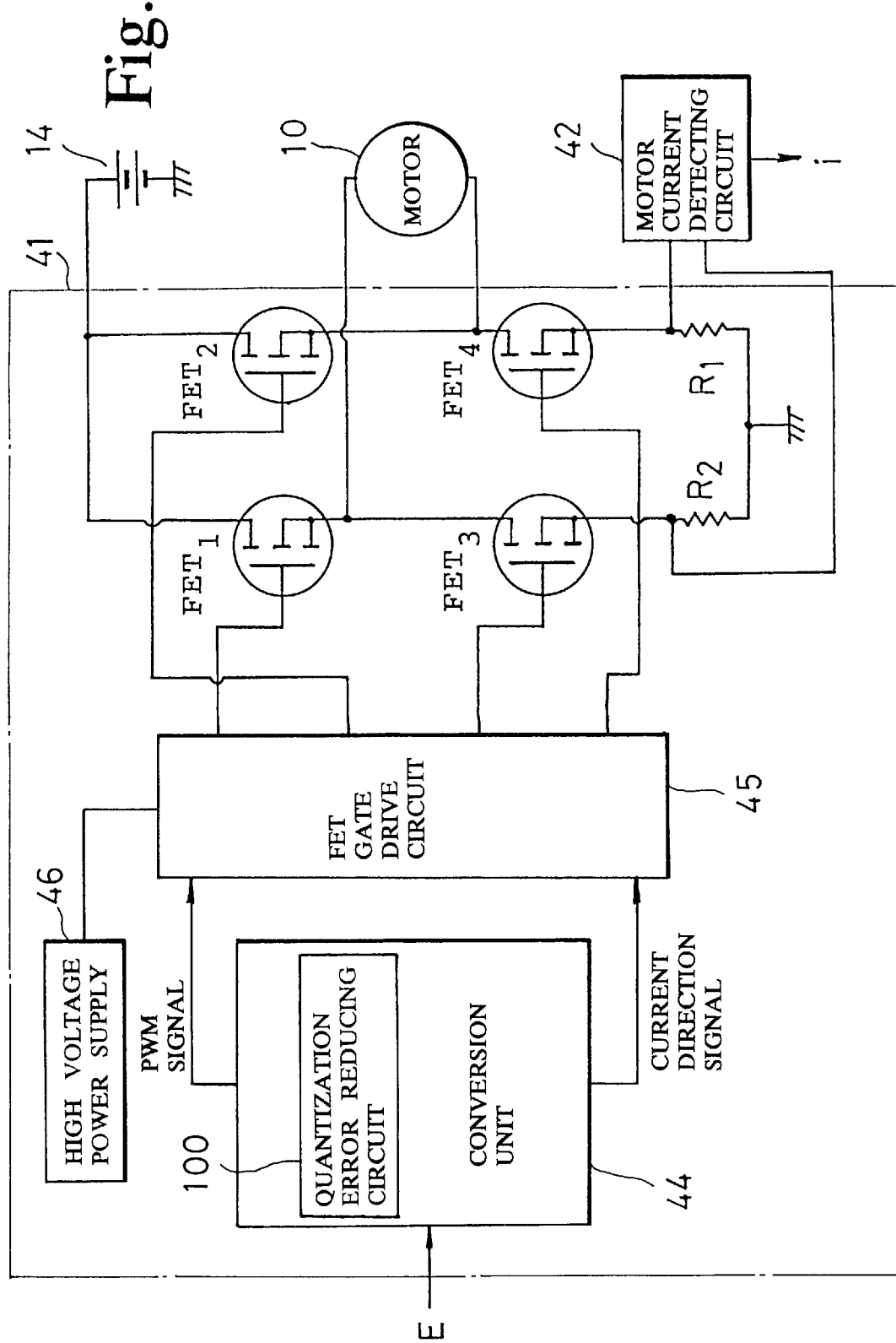
FIG. 8 is a block diagram for a motor-drive circuit.

FIG. 8 shows an example of the constitution of the motor drive circuit 41. The motor drive circuit 41 is constituted by a converting unit 44 for separating and converting the current control value E inputted from the adder 27 into a PWM signal and a current direction signal, FET 1 through FET 4, a FET gate drive circuit 45 for driving to open or close gates of FET 1 through FET 4 and the like. Incidentally, a high voltage power supply 46 is a power source for supplying high voltage to FET 1 and FET 2.

Further, although an explanation has been given of the quantization error reducing circuit 100 previously described in reference to FIG. 2 such that the PWM signal is calculated directly from the steering force assist command value I, in this embodiment, the circuit elements for improving the characteristic of the feed back system are added, the current control value E is provided from the steering force assist command value I and the current control value E is converted into the PWM signal at the converting unit 44. The quantization error reducing circuit 100 is incorporated into processings of converting from 16 bits signals to the PWM signals of 8 bits in the converting unit 44 for inputting the current control value E (16 bits signals).

Further, although in the following explanation, the PWM signal is provided from the current control value E and processings of reducing quantization error are carried out in the procedure, in the procedure for providing the PWM signal from the steering force assist command value I, the lower 8-bit data omitted in the process of providing the PWM signal may be added to the steering force assist command value I thereby reducing the quantization error.

PWM signal (pulse width modulating signal) is a signal for driving gates of FET 1 and FET 2 that are connected in an H bridge and duty ratio (ratio of times for making ON/OFF gate of FET) of PWM signal is determined by an absolute value of the current control value E calculated at the adder 27.

The current direction signal is a signal instructing a direction of current supplied to a motor and is a signal determined by a sign (positiveness or negativeness) of the current control value E calculated at the adder 27.

FET 1 and FET 2 are switching elements gates of which are made ON/OFF based on the duty ratio of the PWM signal and are switching elements for controlling the magnitude of current flowing in the motor. Further, FET 3 and FET 4 are switching elements gates of which are made ON or OFF (when one of them is made ON, other is made OFF) on the basis of the current direction signal and are switching elements for switching the direction of current flowing in the motor, that is, the rotational direction of the motor.

When FET 4 is brought into a conductive state, current is made to flow in FET 1, the motor 10, FET 4 and a resistor R1 whereby current in the positive direction is made to flow in the motor 10. When FET 3 is brought into a conductive state, current is made to flow in FET 2, the motor 10, FET 3 and a resistor R2 and current in the negative direction is made to flow in the motor 10.

A motor current detecting circuit 42 detects the magnitude of current in the positive direction on the basis of a voltage drop at both terminals of the resistor R1 and detects the magnitude of current in the negative direction on the basis of a voltage drop at both terminals of the resistor R2. The detected actual motor current value i is fed back and inputted to the comparator 23 (refer to FIG. 7).

An explanation will be given of calculating the steering force assist command value by the steering force assist command processor 22 according to the present invention.

Figure 9:
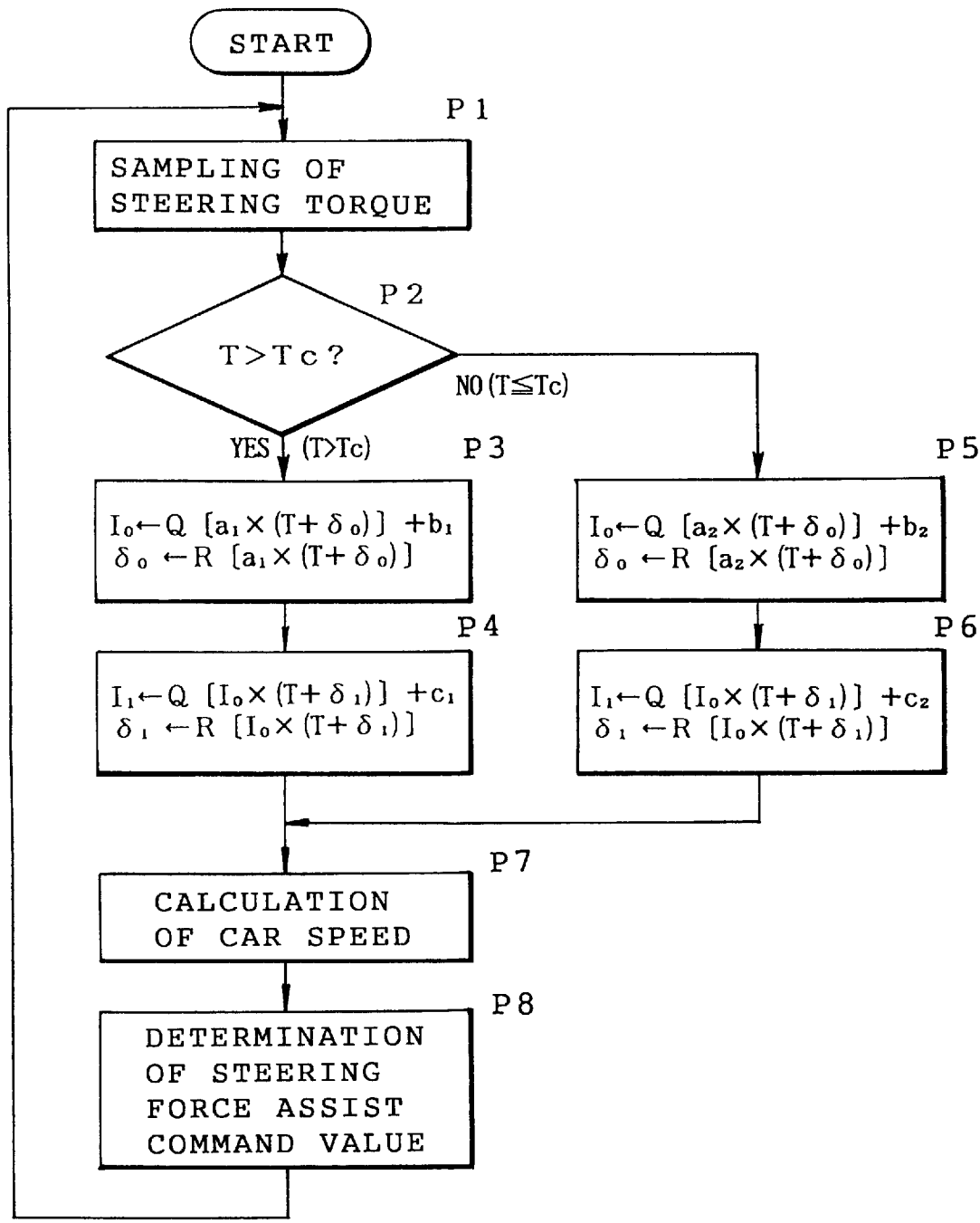
FIG. 9 is a flowchart for explaining calculation processings of a steering force assist command value.

As has been explained, according to the present invention, the higher order function equation $I_n = f(T)^n$ defining the steering force assist command value corresponding to the steering torque, is approximated by Equation (1) and Equation (2) and the steering force assist command value is calculated by Equation (1) and Equation (2). An explanation will be given of calculation processings executed at the steering force assist command processor 22 in reference to a flowchart shown by FIG. 9.

First, the steering torque T is detected by sampling the steering torque (step P1). This operation is achieved by taking out an output from the torque sensor 3 at predetermined time intervals. Next, whether the detected steering torque T is larger than a predetermined value Tc is determined (step P2). This operation is for determining which one of Equation (1) and Equation (2) which approximate the higher order function equation $I_n = f(T)^n$ explained above, is adopted to calculate the steering force assist command value corresponding to the steering torque where a predetermined value Tc is a value of the steering torque at, for example, a point (r) of FIG. 1.

When T>Tc by the determination of step P2, the operation proceeds to steps P3 and P4. Here, the steering force assist command value I1 is calculated by Equation (1) where the calculation is carried out by two times to facilitate the calculation since Equation (1) includes a square term of T. That is, Equation (1) can be rewritten as follows.

$$I_1 = (a_1 \times T + b_1) \times T + c \quad (4)$$

Then, in the following calculation, a term of $(a_1 \times T + b_1)$ is calculated thereby calculating an intermediate value $I_0$ and $(I_0 \times T + c)$ is calculated in the second calculation.

First, the first calculation is carried out. The coefficient $a_1$ is multiplied by a value $(T+\delta_0)$ where the steering torque T is added with an error $\delta_0$ of lower 8 bits omitted in the calculation at a previous sampling $[a_1 \times (T+\delta_0)]$ and a value of higher 8 bits $Q[a_1 \times (T+\delta_0)]$ is added with a coefficient $b_1$. That is, $\{Q[a_1 \times (T+\delta_0)] + b_1\}$ is calculated to form the intermediate value $I_0$. Further, the omitted lower 8 bits $R[a_1 \times (T+\delta_0)]$ is stored in a memory as the error $\delta_0$ of new lower 8 bits which are added in the calculation in a successive sampling (step P3).

Here, Q is a sign signifying higher 8 bits and Q[ . . . ] signifies higher 8-bit data, R is a sign signifying lower 8 bits and R[ . . . ] signifies lower 8-bit data (step P3).

Next, the operation proceeds to the second calculation. The previously calculated intermediate value $I_0$ is multiplied by a value $(T+\delta_1)$ where the steering torque T is added with the error $\delta_1$ of lower 8 bits omitted by the calculation of the previous sampling $[I_0 \times (T+\delta_1)]$ and a value of higher 8 bits $Q[I_0 \times (T+\delta_1)]$ is added with a coefficient $c_1$ thereby calculating the steering force assist command value $I_1$. That is, $\{Q[I_0 \times (T+\delta_1)] + C_1\}$ is calculated. Further, a value of the omitted lower 8 bits $R[I_0 \times (T+\delta_1)]$ is stored in the memory as the error $\delta_1$ of new lower 8 bits, which is added in the calculation in the next sampling (step P4).

When $T \leq Tc$ in the determination of step P2, the operation proceeds to steps P5 and P6 and carries out calculation similar to that in steps P3 and P4. First, in the first calculation, a coefficient a2 is multiplied by a value $(T+\delta_0)$ where the steering torque T is added with the error $\delta_0$ of lower 8 bits omitted by the calculation in the previous sampling $[a_2 \times (T+\delta_1)]$, and $\{Q[a_2 \times (T+\delta_0)] + b_2\}$ is calculated by adding a coefficient $b_2$ to a value of higher 8 bits $Q[a_2 \times (T+\delta_0)]$ to form the intermediate value $I_0$. Further, a value of omitted lower 8 bits $R[a_2 \times (T+\delta_0)]$ is stored in the memory as the error $\delta_0$ of new lower 8 bits, which is added in the calculation in the next sampling (step P5).

Next, the operation proceeds to the second calculation where the previously calculated intermediate value $I_0$ s multiplied by a value $(T+\delta_1)$ where the steering torque T is added with the error $\delta_1$ of lower 8 bits omitted in the calculation in the previous sampling $[I_0 \times (T+\delta_1)]$ and a value of higher 8 bits $Q[I_0 \times (T+\delta_1)]$ is added with a coefficient $C_2$ to calculate the steering force assist command value $I_1$. That is, $\{Q[I_0 \times (T+\delta_1)] + C_2\}$ is calculated. Further, a value of omitted lower 8 bits $R[I_0 \times (T+\delta_1)]$ is stored in the memory as the error $\delta_1$ of new lower 8 bits which is added in the calculation by the next sampling (step P6).

Next, interpolation calculation of the car speed is carried out (step P7) and the steering force assist command value I is determined and outputted (step P8) and the operation returns to step P1 to carry out the calculation in the next sampling operation of the steering torque.

Figure 10:
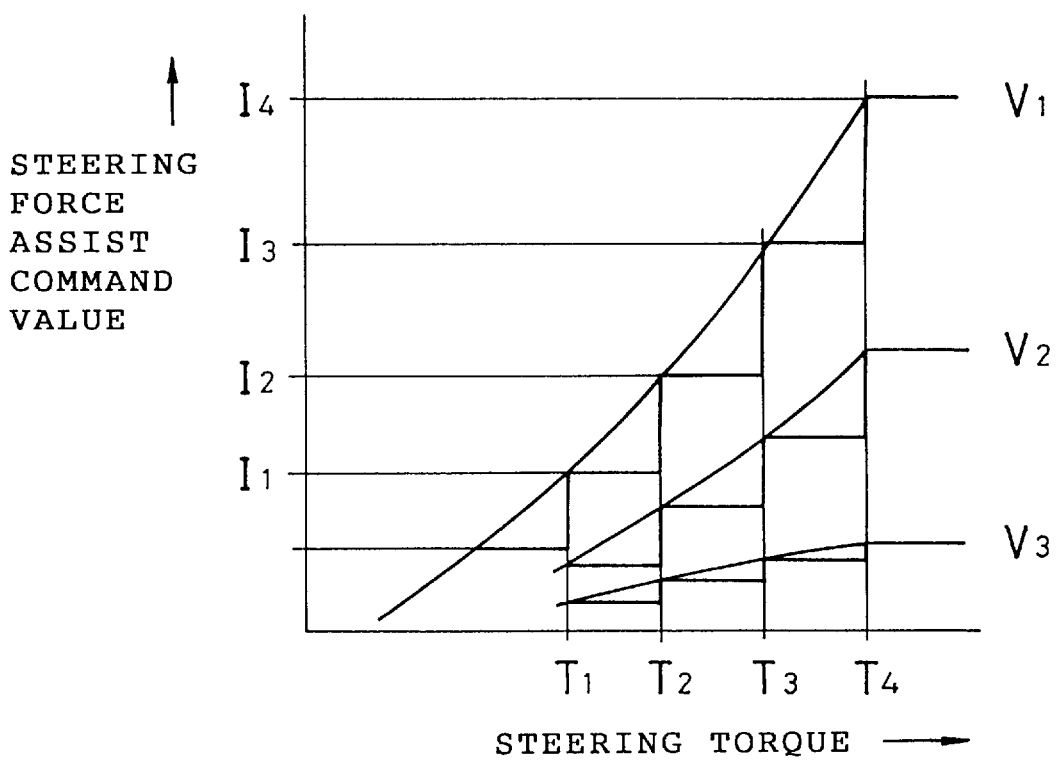
FIG. 10 is a diagram for explaining of setting steering force assist command values in correspondence with steering torques in a conventional example.

Here, an explanation will be given of the interpolation calculation of the car speed. As has been explained in reference to FIG. 10, the relationship between the steering torque and the steering force assist command value corresponding to the steering torque is changed in accordance with the car speed. Therefore, a plurality of the approximation equations of the function equation for determining the steering force assist command value are set in accordance with the car speed and accordingly, the above-described calculation is carried out by pertinently selecting the approximation equation in accordance with the detected car speed. Furthermore, a more pertinent steering force assist command value can be calculated by carrying out a correction in correspondence with an intermediate car speed. Such an interpolation calculation of the car speed has already been proposed by the applicant (Japanese Application No. Heisei 6-316003) although a detailed explanation thereof will be omitted since it is not the object of the present application.

According to embodiments explained above, the electronic control circuit is constituted by CPU having 8 bits, in the calculation of the steering force assist command value, higher 8 bits of 16-bit data obtained by the procedure of calculation, are outputted as the steering force assist command value data and lower 8-bit data is added to the next calculation as an error. However, the explanation has been given when the electronic control circuit is constituted by CPU having 8 bits. Even in the case where the electronic control circuit is constituted by CPU having bits other than 8 bits, lower bits data constitutes an error if higher bits are similarly outputted as steering force assist command value data. The method of processings according to the present invention where the error is added to a next calculation in this way, is naturally applicable to data processings by CPU having bits other than 8 bits as a method of reducing a quantization error on the basis of a digital calculation.

As has been explained, according to the control apparatus for an electric power steering system of the present invention, the steering force assist command value corresponding to the steering torque is defined by a predetermined higher order function equation and the steering force assist command value corresponding to the detected value of the steering torque is calculated and determined on the basis of the approximation equations approximated to the higher order function equation and accordingly, a pertinent steering force assist command value corresponding to the steering torque can be provided with no need of a memory having a significantly large capacity as in the case where the steering force assist command value corresponding to the steering torque is stored in the memory by which an electronic power steering system having a smooth steering feeling can be provided.

Further, in calculating the steering force assist command value corresponding to the steering torque is calculated, lower digits of the result of calculation are omitted when the calculation is carried out by a limited word length whereby the quantization error on the basis of the digital calculation is caused, however, according to the present invention, the error is added in the next calculation procedure whereby the quantization error can be reduced. Thereby, the limit cycle vibration caused by deficiency in the resolution of a PWM signal processing circuit or an A/D conversion circuit, is reduced. Particularly, in performing mild steering, discontinuous steering feeling is not caused to a driver and an electronic power steering system having smooth steering feeling can be provided.

What is claimed is:

1. A control apparatus for an electric power steering system, said control apparatus comprising:

steering torque detecting means for detecting a steering torque caused in a steering shaft;

steering force assist command value calculating means for calculating a steering force assist command value which is a target value for controlling a steering assist force caused in the power steering system at least based on the detected steering torque; and motor controlling means for controlling a current value of a motor for assisting a steering operation based on the calculated steering force assist command value;

wherein the steering force assist command value calculating means comprises calculating means based on a plurality of approximation function equations for approximating a higher order function equation, each of said plurality of approximation function equations coinciding with at least three points of the steering force assist command values corresponding to the steering torques defined by the higher order function equation and calculates the steering force assist command value corresponding to a detected value of the steering torque by the calculating means based on the plurality of approximation function equations.

2. A control apparatus for an electric power steering system according to claim 1, wherein the plurality of approximation function equations are two second order function equations (1) and (2) defined as follows;

$$I1 = a1T^2 + b1T + c \qquad (1)$$

$$I2 = a2T^2 + b2T + c \qquad (2)$$

where T: detected steering torque a1, a2, b1, b2 and c: constants

I1, I2: steering force assist command values.

3. A control apparatus for an electric power steering system according to claim 1, wherein the steering force assist command value calculating means is a calculating means constituted by a CPU (Central Processing Unit) performing a numerical calculation based on a plurality of second order function equations for successively performing a digital calculation of the steering force assist command values based on sampled values of the steering torques successively detected at predetermined time intervals, said calculating means outputting as the steering force assist command value only higher digits of a calculation result by omitting predetermined digits or lower thereof and the calculating means being provided with adding means for adding an error value of the omitted predetermined digits or lower in calculating the steering force assist command value based on a next one of the sampled value of the steering torque.

4. A control apparatus for an electric power steering system according to claim 3, wherein the steering force assist command value calculating means obtains 16-bit data as the calculation result, outputs higher 8-bit data thereof as the steering force assist command value and omits lower 8-bit data thereof.

5. A control apparatus for an electric power steering system according to claim 3, wherein the steering force assist command value calculating means obtained 32-bit data as the calculation result, outputs higher 16-bit data thereof as the steering force assist command value and omits lower 16-bit data thereof.

6. A control apparatus for an electric power steering system according to claim 3, wherein the steering force assist command value calculating means is inserted with a low pass filter on an output side thereof.

7. A control apparatus for an electric power steering system according to claim 3, wherein a cut-off frequency of a low pass filter inserted on an output side of the steering force assist command value calculating means is $1/\pi$ or lower than a Nyquist frequency of the control system.

8. A control apparatus for an electric power steering system, said control apparatus comprising:

steering torque detecting means for detecting a steering torque caused at a steering shaft;

steering force assist command value calculating means for calculating a steering force assist command value which is a target value for controlling a steering assist force caused at the power steering system at least based on the detected steering torque; and motor controlling means for controlling a current value of a motor for assisting a steering operation based on the calculated steering force assist command value;

wherein the steering force assist command value calculating means comprises digital calculation means having a bit number larger than a bit number of the motor controlling means, calculates the steering force assist command value based on data of the steering torque sampled at predetermined time intervals and outputs the calculated steering force assist command value to the motor controlling means in which the steering force assist command value is calculated by adding lower bits data of the steering force assist command value that is omitted in outputting the steering force assist command value to the motor controlling means, to data of the steering torque that is sampled at a next time.

9. A control apparatus for an electric power steering system according to claim 8, wherein an electric time constant of the motor for assisting the steering operation is at least $1/2\pi$ of a sampling period of the steering torque.

10. The control apparatus for an electric power steering system according to claim 8, wherein the steering force assist command value calculated by the steering force assist command value calculating means is a current control value of the motor.

* * * * *